US011337881B2

(12) United States Patent
Corrigan et al.

(10) Patent No.: US 11,337,881 B2
(45) Date of Patent: May 24, 2022

(54) EXOSKELETON WITH ADMITTANCE CONTROL

(71) Applicant: New Jersey Institute of Technology, Newark, NJ (US)

(72) Inventors: Madeline Corrigan, West Caldwell, NJ (US); Richard Foulds, Yardley, PA (US)

( * ) Notice: Subject to any disclaimer, the term of this patent is extended or adjusted under 35 U.S.C. 154(b) by 749 days.

(21) Appl. No.: 16/107,041

(22) Filed: Aug. 21, 2018

(65) Prior Publication Data

US 2019/0060155 A1 Feb. 28, 2019

Related U.S. Application Data

(60) Provisional application No. 62/548,602, filed on Aug. 22, 2017.

(51) Int. Cl.
*A61H 3/00* (2006.01)
*A61H 1/02* (2006.01)
(Continued)

(52) U.S. Cl.
CPC .............. *A61H 3/00* (2013.01); *A61H 1/0237* (2013.01); *A61H 1/0266* (2013.01);
(Continued)

(58) Field of Classification Search
CPC .. A61H 1/0274; A61H 1/0277; A61H 1/0281; A61H 1/0285; A61H 1/0288
See application file for complete search history.

(56) References Cited

U.S. PATENT DOCUMENTS

| 2007/0066918 A1* | 3/2007 | Dewald | A63B 23/0355 601/5 |
| 2012/0179075 A1* | 7/2012 | Perry | A61H 1/0281 601/33 |

(Continued)

OTHER PUBLICATIONS

Hyunchul Kim et al., "Admittance Control of an Upper Limb Exoskeleton—Reduction of Energy Exchange". 2012, IEEE (Year: 2012).*

(Continued)

*Primary Examiner* — LaToya M Louis
(74) *Attorney, Agent, or Firm* — Lerner, David, Littenberg, Krumholz & Mentlik, LLP (57) ABSTRACT

A control system and method for an exoskeleton is provided. The control system utilizes the admittance control paradigm to provide a system and method for manipulating the exoskeleton using minimal force from the user. A force/torque sensor and servo motors are fitted onto a passive arm support, enabling motorized support for a user with upper extremity weaknesses. The exoskeleton may be used on any extremity. The admittance control paradigm includes an impedance control and an admittance control to allow a user with upper extremity weakness and limited independence to intuitively and with minimal force control the precise trajectory of their arms to achieve a greater degree of independence in activities of daily living. Unlike existing passive arm supports that utilize springs or rubber bands to balance the user's arm against gravity, this system provides more precise gravity compensation and minimizes the amount of force required to control the exoskeleton.

18 Claims, 3 Drawing Sheets

(51) Int. Cl.
  *G06F 3/0338* (2013.01)
  *G06F 3/01* (2006.01)

(52) U.S. Cl.
  CPC ......... *A61H 1/0274* (2013.01); *A61H 1/0277* (2013.01); *A61H 1/0281* (2013.01); *A61H 1/0285* (2013.01); *A61H 1/0288* (2013.01); *A61H 1/0296* (2013.01); *G06F 3/014* (2013.01); *G06F 3/0338* (2013.01); *A61H 2001/027* (2013.01); *A61H 2003/007* (2013.01); *A61H 2201/0107* (2013.01); *A61H 2201/0165* (2013.01); *A61H 2201/1215* (2013.01); *A61H 2201/1238* (2013.01); *A61H 2201/164* (2013.01); *A61H 2201/165* (2013.01); *A61H 2201/1607* (2013.01); *A61H 2201/1611* (2013.01); *A61H 2201/1638* (2013.01); *A61H 2201/1659* (2013.01); *A61H 2201/50* (2013.01); *A61H 2201/5023* (2013.01); *A61H 2201/5028* (2013.01); *A61H 2201/5061* (2013.01); *A61H 2201/5069* (2013.01); *A61H 2205/06* (2013.01); *G06F 3/011* (2013.01)

(56) References Cited

U.S. PATENT DOCUMENTS

| | | | | |
|---|---|---|---|---|
| 2015/0272805 | A1* | 10/2015 | Burnett | A61F 5/0003 601/79 |
| 2016/0030281 | A1* | 2/2016 | Shafieloo | A61H 23/0245 601/48 |
| 2016/0067494 | A1* | 3/2016 | Lipani | A61H 23/02 607/46 |
| 2016/0206497 | A1* | 7/2016 | Deshpande | A61H 1/0281 |
| 2019/0053968 | A1* | 2/2019 | Vergara | A61H 1/00 |

OTHER PUBLICATIONS

Corrigan et al., "Admittance control of the intelligent assistive robotic manipulator for individuals with Duchenne Muscular Dystrophy: a proof-of-concept design", Journal of Rehabilitation Robotics, May 2015, vol. 3, pp. 1-5.

* cited by examiner

EXOSKELETON WITH ADMITTANCE CONTROL

CROSS-REFERENCE TO RELATED APPLICATION

The present application claims priority to U.S. Provisional Patent Application No. 62/548,602 filed Aug. 22, 2017, the disclosure of which is incorporated herein by reference.

STATEMENT REGARDING FEDERALLY SPONSORED RESEARCH

This invention was made with government support under Agreement No. 90RE5021-01-00 awarded by the National Institute on Disability, Independent Living, and Rehabilitation Research. The government has certain rights in the invention.

FIELD OF THE DISCLOSURE

The present disclosure pertains to robotic and exoskeleton devices. In particular, the present disclosure relates to a motorized arm support provided where the motion of the device is based in real-time force applied by the user through an admittance control.

BACKGROUND

It is well known that individuals with Duchenne muscular dystrophy ("DMD") and other conditions affecting upper extremity function have limited arm function and diminished muscle strength. As the disease progresses, individuals often become too weak to lift their arms against the force of gravity. Several current state of the art devices exist to assist individuals with DMD. These devices include passive arm supports, exoskeletons, and robotic manipulators.

However, these current devices have several limitations. For example, past attempts such as passive arm supports do not employ any electrical power source. Passive arm supports serve to increase the active range of motion ("AROM") by supporting the arm against gravity. These supports typically include springs or rubber bands to provide an upward force to balance the arm. As a result, passive arm supports exhibit inexact gravity compensation. Also, users often lack the sufficient strength required to overcome the inertia of the passive arm support itself.

Other current state of the art devices also fail to fully meet user's needs. Exoskeletons use motors to support and direct the arm through movement. While exoskeletons provide a greater improvement in AROM for individuals without sufficient strength to benefit from a passive arm support, these devices require complex and unintuitive user interfaces such as joysticks and push buttons required to map user intention to complicated arm movements. Similar to passive arm supports, users employing exoskeletons must have sufficient strength in their hand and wrist to interact with objects in their environment.

Further current state of the art devices like robotic manipulators are designed to perform tasks that require reaching and grasping. However, these robotic manipulators also require specialized interfaces such as push buttons or joysticks that are unintuitive and therefore require significant time to complete simple tasks. Additional drawbacks with use of current state of the art devices include a time delay between the user interface and actual related motion of the exoskeleton or arm support. Corrigan et al disclosed an approach to augment upper extremity function by implementing an admittance control interface for an iArm robot. (See, Corrigan, Madeline and Foulds Richard, *Admittance Control of the Intelligent assistive Robotic Manipulator for Individuals with Duchenne Muscular Dystrophy: A Proof-of-Concept Design*, Journal of Rehabilitation Robotics, 3, 1-5 (2015)). It was noted by Corrigan et al that a time delay of 310 ms inherent in the iARM firmware and in the user interface caused instability in the exoskeleton or robotic arm. This delay prevented stable control by the user, and there was a need for a faster control loop.

As DMD is a progressive condition, existing methods lack the capability to accommodate and adjust for deteriorating muscle capacity over time. Accordingly, there is a need for an exoskeleton that can support the arms against gravity using residual strength to provide individuals with increase independence in activities of daily living. In addition, there is a need for a faster control loop in the user interface to allow stable control by the user.

SUMMARY

In accordance with embodiments of the present disclosure, a system and method to motorize a passive support using admittance control is provided. In one embodiment, an exoskeleton, such as an upper extremity exoskeleton, specialized admittance control is provided. The admittance control is a control interface for a robotic arm. The admittance control includes an impedance control that decreases the time delay between a user interface and the actual motion of the exoskeleton and/or robotic arm. The time delay for the admittance control loop is 10 ms or less to ensure stable and safe user exoskeleton interaction.

The exoskeleton may include a passive arm support, a force sensor or a force/torque sensor, and one or more motors. The sensor could be mounted under a forearm cuff to sense a user's applied force or force and torque. Motors could be mounted at each joint to control the position and orientation of the forearm cuff in one, some or all degrees of freedom. This demonstrates the modular nature of the exoskeleton.

Depending on the embodiment, the exoskeleton supports and directs a user's arm through movement based on their residual strength by using an admittance control loop. The present disclosure provides individuals with DMD and other disabilities with a higher degree of independence in activities of daily living.

The method may involve the steps of providing a passive arm support, and retrofitting the passive arm support with a force sensor or force/torque sensor and a motor or motors. The method includes the step of implementing an admittance control loop.

Again, depending on the embodiment, the exoskeleton may be fully motorized. Alternatively, the exoskeleton could be motorized in one or some degrees of freedom while maintaining some passive degrees of freedom. The exoskeleton could incorporate the sensor and motors to partially motorize different degrees of freedom as needed, or the exoskeleton could be fully motorized in all degrees of freedom. Accordingly, the exoskeleton could be tailored to each individual user's needs based on how much residual force the individual can produce in each direction or degree of freedom. Furthermore, in the presence of conditions that result in progressive muscle loss, such as but not limited to DMD, the exoskeleton can be modified over time by adding more sensors and/or motors as the individual loses strength over time and their capabilities change.

The exoskeleton provides increased independence in activities of daily living for individuals with limited muscle strength. The exoskeleton also can be used in conjunction with virtual reality games as a stroke rehabilitation device to assist individuals post stroke to rehabilitate lost upper extremity function.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using an exoskeleton, which utilizes admittance control, and associated systems and methods, reference is made to the accompanying figures, wherein.

DETAILED DESCRIPTION

The present disclosure relates to an upper extremity exoskeleton. It should be understood, however, that the teachings herein can be used with other types of exoskeletons. Applications for such exoskeletons range from medical applications to military applications and civilian uses.

Figure 1:
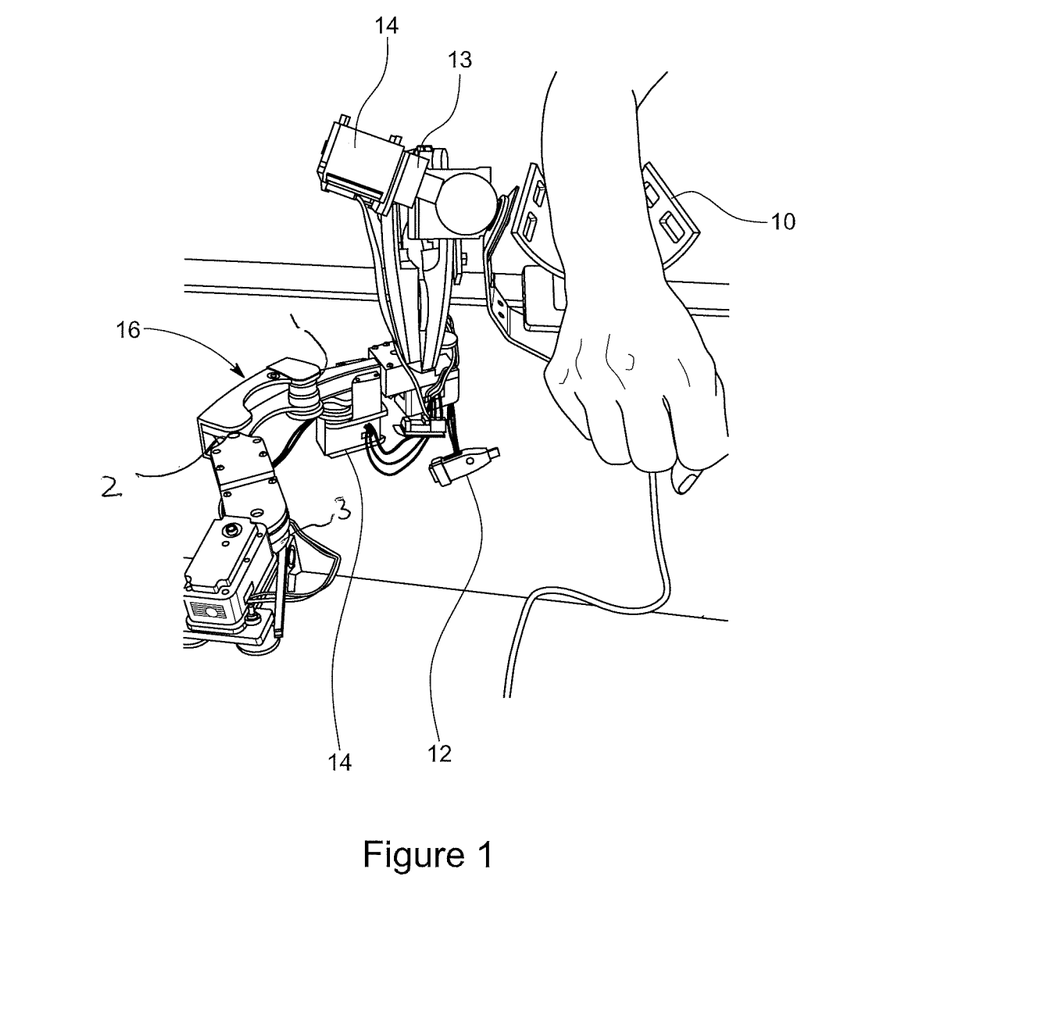
FIG. 1 is a photograph of a five degree of freedom ("DOF") exoskeleton and force/torque sensor in accordance with the present disclosure.
Figure 4:
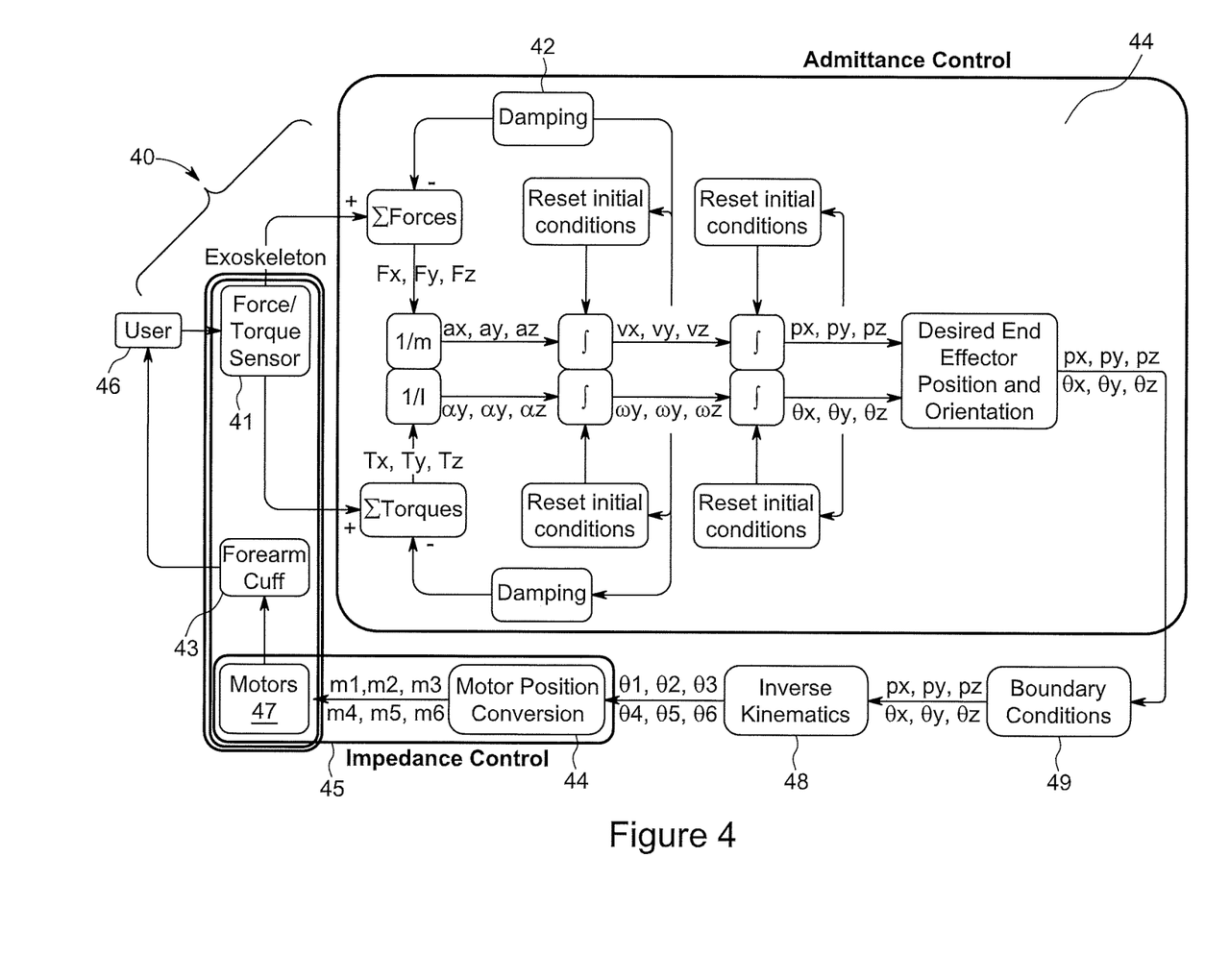
FIG. 4 is a block diagram of a control loop that may be used with the present disclosure.

FIG. 1 is a photograph of an upper extremity exoskeleton in accordance with one embodiment of the present disclosure. The upper extremity exoskeleton includes a forearm cuff 10, a force/torque sensor 12, one or more motors 14, and an arm support 16 having one or more degrees of freedom (DOF). In one embodiment, the arm support 16 was retrofitted with the force/torque sensor and the motors to operate in all DOFs. The motors operate using a proportional-integral-derivative controller (PID controller) while the exoskeleton operates under admittance control. The PID controller is a control loop feedback system mechanism widely used in industrial control systems and a variety of other applications requiring continuously modulated control. Admittance control involves the combination of the force sensors, motors and related software. As shown in FIG. 4, a control loop of the present disclosure utilizes an admittance control to control position and orientation of an exoskeleton. The control loop utilizing the admittance control includes an impedance control for motor position conversion and is in communication with the motors of the exoskeleton. Admittance and impedance controls will be discussed in further detail below.

An example of a suitable commercially available arm support used in connection with the apparatus of the present embodiment is the Armon Edero 5 DOF arm support, which is made by Armon Products. The Armon Edero 5 DOF has low-friction joints and an adjustable spring to provide support against gravity. It will be understood that other types of arm supports could be used with varying degrees of freedom. These commercially available arm supports lack, among other things, the ability for interaction with users that have impairments in motor/skeletal muscle functions.

In the embodiment shown in FIG. 1, the force/torque sensor 12 could be mounted under the forearm cuff to detect a user's applied force in the x, y, and z directions axis (longitudinal, vertical, lateral) and applied torque in the pitch and yaw directions. The sensor 12 provides input for an admittance control algorithm, which translates the user's input into motion. The admittance control algorithm will be discussed in further detail hereinafter.

Motors are mounted onto the arms to provide motorized control of the arms. In particular, the motors serve to control the angular position of each of the six joints. In this embodiment, the exoskeleton is fully motorized and admittance control is used to control all servo motors.

An example of a suitable commercially available force/torque sensor is the 6 DOF ATI Industrial Automation force/torque sensor. An example of a suitable commercially available motor is the Robotis MX Series Dynamixel Smart Servo motor. It will be understood that other types of force/torque sensors and motors could be used. In this embodiment, the custom motor mounts, gears, force sensor mounts, and forearm cuff were designed using Pro/ENGINEER and Creo Parametric 3.0 CAD Software by PTC and fabricated using a Flashforge Creator Pro 3D Printer. In this embodiment, the control software was implemented using 32 bit MATLAB.

The exoskeleton could be mounted in any manner or on any platform. For example, the exoskeleton device may be mounted on a user's wheelchair, a table or a desk at which the user is seated. A person having ordinary skill in the art could mount the arm in a multitude of other locations.

In operation, the user places their arm in the forearm cuff. The exoskeleton is calibrated to balance the user's extremity against gravity. The exoskeleton provides a constant upward force equal and opposite to the force of gravity acting on the users arm. This upward force is accomplished in many ways, such as, but not limited to various types of motors, force inducer motors, and the like. The user moves their arm in space to perform the desired activities of daily living or rehabilitation movements if the exoskeleton is being using for rehabilitative purposes. The user's movement is translated through the sensor and processed through the admittance control algorithm, thereby providing movement. The movement of the exoskeleton is based on the magnitude and direction of the user's applied force. Accordingly, as the user moves their arm, the exoskeleton moves in the same direction. As such, movement with the support of the device is intuitive. The user moves their arm as they otherwise would if they could perform the movements unsupported.

An overview of admittance control is provided herein. Admittance control is a robotic control paradigm in which the motion of a robot is controlled by the force applied by a user's arm. In particular, the robotic control paradigm maps the user's applied force to the motion of a robotic arm using a virtual point mass. With the virtual point mass, fiction and inertia of the exoskeleton are minimized, allowing for users with DMD to operate the arm despite diminished muscle strength.

The user's input, delivered by a force/torque sensor or other sensors, is processed through an admittance control loop. The user only needs to overcome the inertia of the specified virtual point of mass, and a specified damping coefficient. This allows for proportional and compliant control as admittance control mimics passivity, which makes it inherently safe and intuitive.

Admittance control of a robotic arm enables the user to experience significantly increased AROM and a higher degree of independence in activities of daily living. This is possible because the user only needs enough strength to be sensed by the force or force/torque sensor, and does not have to overcome the inertia of the entire robotic arm or of gravity, only that of the virtual point mass. Furthermore, the system provides motorized antigravity assistance, which is incorporated by applying a vertical force equal and opposite to the force of gravity acting on the user's arm. Relating to the admittance control paradigm as a whole, force encountered by an admittance control robot will not translate to the user interface, and not oppose the user's movements as only forces applied to the side of the force/torque sensor attached to the user's arm are registered by the admittance control loop.

The antigravity assistance described is more precise than conventional passive arm supports, which utilize springs or bands to compensate for gravity. The antigravity force mechanism, depending on the implementation, may be selected from a group consisting of a, any motor mechanism, a servomotor mechanism, a pneumatic drive mechanism, a dampener, a dashpot, and any combination thereof. Furthermore, as the damping coefficient and virtual mass/inertia parameter in an admittance control system is dynamic and programmable, it can be easily adjusted without changing components of the arm to compensate for changes in the medical condition of the user, unlike the constant coefficient of a spring or rubber band system.

Figure 2:
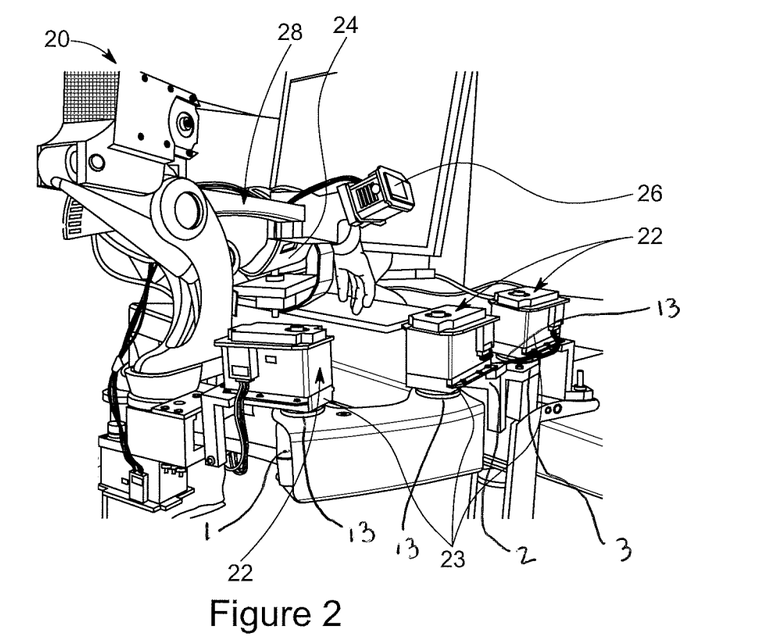
FIG. 2 is a photograph of a three DOF robotic arm and force/torque sensor in accordance with the present disclosure.

Adverting to FIG. 2, shown is a photograph of an upper extremity exoskeleton 20 in accordance with another embodiment of the present disclosure. In this embodiment, admittance control is applied to a fully motorized three degree of freedom (3 DOF) system 22. The exoskeleton could include a forearm cuff 24, a force sensor 26, motors 23, and an arm support 28 having one or more degrees of freedom (DOF).

An example of a suitable commercially available force sensor is the Optoforce 200N 3 DOF force sensor. It will be understood that other types of force sensors could be employed. In this embodiment, the control software was implemented using 64 bit MATLAB. Depending on the implementation, any programming language and/or controller may be used.

The mechanical design of the embodiment shown in FIG. 2 was improved by eliminating the gears at joints 1, 2, and 3 that control the x and y position of the end effector. By attaching the motor horns 13 so that they directly drive the joint, instead of using gears, eliminates the backlash, or play, that can propagate motor error to end effector position error. The return delay time of the Dynamixel motors was set to 2 microseconds to minimize the time per data value that it takes from the transmission of the instruction packet until the return of the status packet. The motor horns 13 are an attachment on the motor that allows motion translation of a shaft to an actual physical body outside the motor. Depending on the implementation gears and/or direct drive systems may also be used in addition to or in combination with the motor horns 13.

Because the Armon Edero arm has a redundant horizontal link (i.e., has three links to achieve the desired x and y position), the inverse kinematics involve solving for an infinite number of solutions. In this embodiment, the inverse kinematics code was optimized by limiting the range of possible solutions to +/−5° from the previous joint angles in increments of 0.02°. The result was only 500 possible solutions with increased resolution compared to the previous embodiment that solved for possible solutions in increments of 0.1°. Lastly, the mass and damping values were tuned to improve the smoothness and ease of movement. The mass was set to 0.25 kg and the damping value to 5 N*sec/m.

Figure 3:
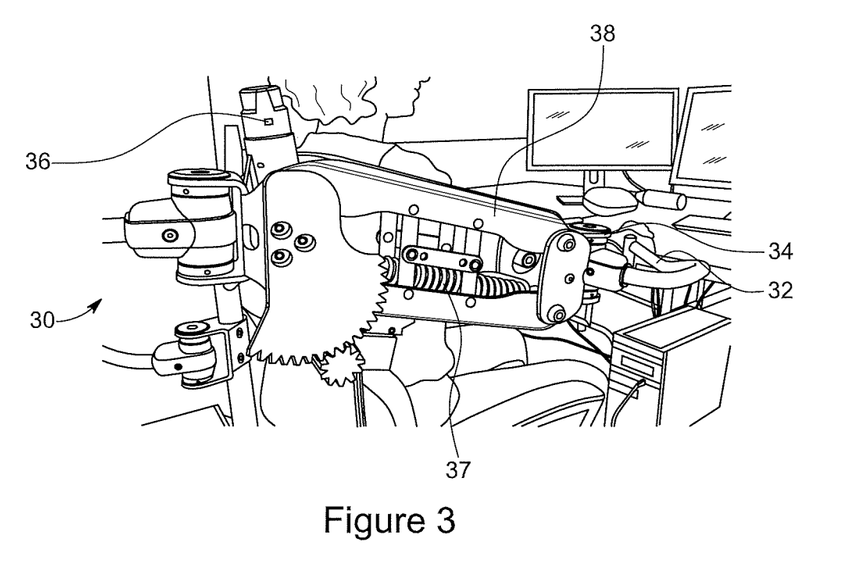
FIG. 3 is a photograph of a passive-motorized hybrid arm, which operates under admittance control in a vertical plane while remaining passive in all other DOFs, in accordance with the present disclosure.

FIG. 3 illustrates a photograph of an upper extremity exoskeleton 30 in accordance with another embodiment of the present disclosure. In this embodiment, admittance control is applied to a passive-motorized hybrid system. The exoskeleton could include a forearm cuff 32, a force sensor 34, motors 36, and an arm support 38 having one or more degrees of freedom (DOF). Again the force sensor 34 may be place in one or more various positions and places, including but not limited to the forearm cuff, wrist, forearm, bicep, and the like.

Depending on the embodiment, only one DOF is motorized while the remaining DOFs are not motorized. It will be understood that the number of DOFs that are motorized in each embodiment could vary, demonstrating the modular nature of the present invention. Other embodiments could include one or more DOF in the admittance control loop while the remaining DOF are passive.

In FIG. 3, a passive 5 DOF arm support with an adjustable spring 37 located in a four-bar linkage to provide support against gravity is fitted with a Dynamixel motor to control the elevation or z position. A person having ordinary skill in the art could utilize any passive arm support with a multitude of DOFs, and could also use any similar motor. An example of a suitable commercially available passive arm support is the X—Ar arm support, made by Equipos.

FIG. 3 also illustrates that the x and y positions, pitch, and yaw orientations are operated passively, while the z position is controlled by a three 3 DOF Optoforce force sensor placed under the user's forearm to sense the user's applied force in the z-direction. It will be understood that other types of sensors could be employed, including a 1DOF force sensor or a load cell that senses tension and compression.

This embodiment effectively provides assistance against gravity and reduction of inertia in the z direction. For passive-motorized hybrid embodiments, the admittance control loop is adjusted to control the z-position only and equation 14 below is used to calculate the joint angle required to achieve the desired elevation for each iteration of the control loop. The virtual mass was set to 0.5 kg and damping coefficient was set to 25 N*sec/m.

FIG. 4 is a schematic diagram showing a 6 DOF control loop 40 implemented in 64 bit MATLAB to control the position and orientation of the motorized arm based on a user's applied force and torque. The admittance control loop could be implemented for any number of DOF. The system 40 may include an admittance control 44, an impedance control 45, an exoskeleton 43 utilized by a user 46. The impedance control is coupled to the exoskeleton 43, and controls motors 47 of the exoskeleton. The impedance control 45 also includes motor position conversion tool 44. Motor position conversion 44 is coupled with admittance control 44 and receives inverse kinematics 48 and boundary conditions 49 from admittance control 44. Sensor 41 relays information received from user 46. Movement, force, torque and other information from sensor 41 is transmitted to the admittance control 44. A desired end effector, position and orientation is determined in the admittance control 44 and transmitted to impedance control 45 that controls motors 47 of exoskeleton 43.

For admittance control, the input is force and the output is motion/position. While impedance control utilizes position as the input and the output is torque. For an impedance control device, positional data is feed in and the robot moves based on where a user tells it to go. Because in the present disclosure force data is feed in when the admittance control is used, the output is positional data. But then that positional data needs to be feed into to the motors. The motors output a torque which then moves the robot (and in turn the person's arm). Thus, the implementation of admittance control includes an impedance control to close the loop.

The users applied force and torque is sensed by a 6 DOF force/torque sensor 41. The sensor measures the desired movement in the x, y, z axis (longitudinal, vertical, lateral) and angular changes in pitch and yaw. In one embodiment, the sensor also measures angular changes in the roll direction. As such, the present invention could implement admittance control in a 6th DOF.

The x, y, and z forces are divided by a virtual mass of 0.05 kg. The resulting acceleration is integrated twice using CVode to calculate the position to which the virtual mass would move under the user's applied force and specified damping. The x and y (pitch and yaw) torques are divided by the moment of inertia of a 0.05 kg point mass. The resulting angular acceleration is integrated twice using CVode to calculate the angle to which the virtual mass would rotate under the user's applied torque and specified damping.

The damping coefficients represented by numeral 42 are determined empirically to keep the system stable while minimizing the force opposing the user's movement. In this embodiment, the damping coefficients are set to 10 N*sec/m in the x and y directions, 12 N*sec/m in the z direction, and 25 Nm*sec/rad in the yaw and pitch directions. These values are multiplied by the calculated velocity and subtracted from the user's applied force and torque for each iteration of the admittance control loop.

The motor baud rate is set to 2 Mbps to maximize the baud rate to communicate with a controller. The controller may be internal to the servo motor or motors that control the passive arm support. In one embodiment, to reduce read and write times, "syncwrite" and "syncread" are used as it allows for a single instruction packet to be sent in order to command a desired position to all six motors, and a single instruction packet to be sent to read the current position from all six motors. As a result, each iteration of the control loop required two instruction packets. Other embodiments could have different damping coefficients and baud rates depending on the application.

The desired position and orientation of the exoskeleton end effector, or forearm cuff, calculated by the admittance control loop is checked for whether it satisfies boundary conditions at each iteration of the control loop. If not, the position and orientation is reset accordingly. Custom inverse kinematics calculates the six joint angles required to achieve the desired end effector position and orientation.

Equations 11-14 show the inverse kinematics equations used to calculate the joint angles ($\theta_1$, $\theta_2$, $\theta_3$, and $\theta_5$) required to achieve the desired end-effector position (x, y, and z) based on the link lengths of the robotic arm. In one embodiment, the link lengths are 11, 12, 13, and 15.

In one embodiment, angles 1, 2, and 3 control the angular position of theoretical joints 1, 2, and 3 respectively, which control the x, y position of the arm support end effector (cuff). Angle 5 controls the angular position of respective theoretical joint 5 which controls the z position of the end effector/cuff. Also, a theoretical joint 4 may control the yaw movement, and theoretical joint 6 may control the pitch. In such an embodiment, the angles of joints 4 and 6 ($\theta_4$ and $\theta_6$), controlling the orientation of the end-effector, are determined from the control algorithm based on the user's applied torque.

Other embodiments could control a multitude of joint angles. The resulting joint angles are converted to motor positions and used to control the angle of each servo motor to translate and orient the forearm cuff and the user's arm to the desired position and orientation for each iteration of the control loop based on the applied force and torque. As a result, the user is intuitively controlling the motion of the forearm cuff while only being opposed by the inertia of the 0.5 kg virtual mass and the specified damping required to keep the system stable.

Assistance against gravity is achieved by calibrating the force/torque sensor while the user's arm is at rest in the forearm cuff. Doing so provides the user with an upward force equal and opposite to the force of gravity that is acting on the user's arm during the calibration of the sensor.

$$\theta_1 = a\tan2(y - l_3\sin\phi, x - l_3\cos\phi) - a\tan2(l_2\sin\theta_2, l_1 + l_2\cos\theta_2) \quad (11)$$

$$\theta_2 = 2\tan^{-1}\left(\frac{(l_1 + l_2)^2 - (x_3^2 + y_3^2)}{(x_3^2 + y_3^2) - (l_1 - l_2)^2}\right) \quad (12)$$

$$\theta_3 = \phi - \theta_1 - \theta_2 \quad (13)$$

$$\theta_5 = \sin^{-1}\left(\frac{z}{l_5}\right) \quad (14)$$

In other embodiments, the admittance control paradigm and apparatus could employ other types of robotic arms with one or more degrees of freedom. It will be understood that other force/torque sensors could also be utilized, at more than one DOF, at any particular scale. It is also understood that any passive-motorized DOF setup could be devised based on the given application. One skilled in the art could apply the described admittance control paradigm to non-medical robotic or automation systems in which robotic assistance is needed.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made expressly herein, without departing from the spirit and scope of the invention.

The invention claimed is:

1. An exoskeleton system comprising:
    a passive arm support having at least one joint to articulate the arm support;
    a forearm cuff attached to or integral to the arm support;
    at least one sensor attached between the forearm cuff and the passive arm support, the sensor being adapted to detect applied force, or torque from a user;
    a plurality of motors mounted at each joint in the arm support to control position and orientation of the forearm cuff, and to create a passive-motorized hybrid arm support, the plurality of motors enabling motorized control of the arm support;
    a plurality of motor horns attached on the plurality of motors that allows motion translation of a shaft to a physical body outside the motors so that the motor horns directly drive the at least one joint for eliminating backlash or play that propagate motor error and position error;

an antigravity force mechanism that applies a constant upward and vertical force equal and opposite to a force of gravity acting on a user's arm;

a controller coupled to the plurality of motors and the at least one sensor, an admittance control loop to motorize the passive support, wherein the controller is programmed with the admittance control loop;

an admittance control and an impedance control to control the position and orientation of the passive arm support based on applied forces and torques from the user;

the admittance control is applied to a fully motorized three degree of freedom (3 DOF) system, a motor position conversion unit coupled with the admittance control for receiving inverse kinematics and boundary conditions from the admittance control;

an exoskeleton for support and direction of the user's arm through movement based on a residual strength of the user, and processed through the admittance control loop, wherein the passive support uses the admittance control and the impedance control for user exoskeleton interaction;

wherein the antigravity force mechanism further includes a virtual mass, and a damping or a damping coefficient required to keep the exoskeleton stable;

wherein, the user is able to be controlling motion of the forearm cuff while only being opposed by inertia of the virtual mass and the damping;

a time delay for the admittance control loop that is 10 ms or less to ensure the user exoskeleton interaction, wherein the impedance control decreases the time delay between a user interface and actual motion of the exoskeleton;

a virtual point mass for mapping the user's applied force to motion of the exoskeleton wherein the virtual point mass, friction, and inertia of the exoskeleton are minimized as compared to not using the virtual point mass for users with Duchenne muscular dystrophy (DMD) to operate the exoskeleton despite user diminished muscle strength;

the virtual point mass is set at 0.5 kg and the damping coefficient is set at 25 N*sec/m.;

a wheelchair, a table, or a desk at which the user is seated for mounting the exoskeleton thereon;

wherein, a joint angle is converted to a motor position and used to control an angle of each motor to translate and orient the forearm cuff and the user's arm to a desired position and orientation for each iteration of the control loop based on an applied force and a torque; and wherein, the user is intuitively controlling motion of the forearm cuff while only being opposed by the inertia of the 0.5 kg virtual mass and the damping coefficient required to keep the system stable.

2. The exoskeleton of claim 1, wherein the admittance control receives from the sensor movement, force, and torque information and the admittance control determines a desired end effector, position, and orientation for transmission to the impedance control that controls the motors of the exoskeleton.

3. The exoskeleton of claim 1, further including a direct drive system that is used in combination with the motor horns.

4. The exoskeleton of claim 1, wherein the sensor is a force sensor, and the force sensor is adapted to detect user input in a vertical axis.

5. The exoskeleton of claim 1, wherein the sensor is a force-torque sensor, and the force-torque sensor is adapted to detect and measure movement in a "x" axis, a "y" axis and a "z" axis, and a first and a second angular change in pitch and yaw, wherein the sensor also measure a third angular change in a roll direction.

6. The exoskeleton of claim 1 wherein the antigravity force mechanism that further includes the damping coefficient and the virtual mass is dynamic and programmable for adjustment without changing components to compensate for changes in a medical condition of the user.

7. The exoskeleton of claim 1, wherein the antigravity force mechanism is selected from a group consisting of a motor controlled by a positional-integral-derivative controller (PID), a servomotor mechanism, a pneumatic drive mechanism, a dampener, a dashpot, and any combination thereof.

8. The exoskeleton of claim 1, wherein the admittance control has input of force from the residual strength of the user and output of position; and wherein the impedance control utilizes the user's arm position as input and the output is torque.

9. The exoskeleton of claim 1, wherein the virtual mass and the damping coefficient is dynamic and programmable to adjust without changing components of the exoskeleton to compensate for changes in user medical condition.

10. A method of using an exoskeleton system, comprising: providing an exoskeleton system according to claim 1; wherein the passive arm support is retrofitted with the force sensor and the motor; and implementing the admittance control loop within the motor.

11. An exoskeleton system comprising:
a passive support having at least one joint to articulate the passive support;
a forearm cuff attached to or integral to the support;
at least one sensor attached between the forearm cuff and the passive support, the sensor being adapted to detect applied force, or torque from a user;
a plurality of motors mounted at each joint in the passive support to control position and orientation of the forearm cuff, and to create a passive-motorized hybrid support, the plurality of motors enabling motorized control of the passive support;
an antigravity force mechanism that applies a constant upward and vertical force equal and opposite to a force of gravity acting on a user's arm,
a controller coupled to the plurality of motors and the at least one sensor,
an admittance control loop to motorize the passive support, wherein the controller is programmed with the admittance control loop;
an admittance control and an impedance control to control the position and orientation of the passive support based on applied forces and torques from the user;
the admittance control is applied to a fully motorized three degree of freedom (3 DOF) system,
a motor position conversion unit coupled with the admittance control for receiving inverse kinematics and boundary conditions from the admittance control;
an exoskeleton for support and direction of an arm of the user through movement based on a residual strength of the user, and processed through the admittance control loop, wherein the passive support uses the admittance control and the impedance control for user exoskeleton interaction;

wherein the antigravity force mechanism further includes a virtual mass, and a damping or a damping coefficient required to keep the exoskeleton stable;

wherein, the user is able to be controlling motion of the forearm cuff while only being opposed by inertia of the virtual mass and the damping;

a time delay for the admittance control loop that is 10 ms or less to ensure the user exoskeleton interaction, wherein the impedance control decreases the time delay between a user interface and actual motion of the exoskeleton;

a virtual point mass for mapping the user's applied force to motion of the exoskeleton wherein the virtual point mass, friction, and inertia of the exoskeleton are minimized as compared to not using the virtual point mass for users with Duchenne muscular dystrophy (DMD) to operate the exoskeleton despite user diminished muscle strength;

the virtual point mass is set at 0.5 kg and the damping coefficient is set at 25 N*sec/m.;

a wheelchair, a table, or a desk at which the user is seated for mounting the exoskeleton thereon;

wherein, a joint angle is converted to a motor position and used to control an angle of each motor to translate and orient the forearm cuff and the user's arm to a desired position and orientation for each iteration of the control loop based on an applied force and a torque; and wherein, the user is intuitively controlling motion of the forearm cuff while only being opposed by the inertia of the 0.5 kg virtual mass and the damping coefficient required to keep the system stable.

12. The exoskeleton system of claim 11, wherein the passive support is configured to be attached to a limb of the user.

13. The exoskeleton system of claim 12, wherein the limb includes: an arm, a forearm, a leg, an ankle, a finger, a foot, a toe, a hand, a neck, a head, a wrist, and any combination thereof.

14. The exoskeleton system of claim 11, wherein the passive support is configured to be attached to a limb of the user, and the admittance control loop detects a force applied by the limb of the user and converts the force into positional data to position the passive support and the limb of the user.

15. The exoskeleton system of claim 14, wherein the force is detected in z direction.

16. The exoskeleton system of claim 11, wherein acceleration, position, and corresponding motor positions are calculated based on a user's real-time applied force every 0.01 seconds, and wherein every iteration of the admittance control loop operates at 100 Hz for the user to control a position of a limb of the user in space while only opposed by inertia of a smaller point of mass than applied to the passive support.

17. A method of using an exoskeleton system, comprising: providing an exoskeleton system having:
a passive arm support having at least one joint to articulate the arm support;
a forearm cuff attached to or integral to the arm support;
at least one sensor attached between the forearm cuff and the passive arm support, the sensor being adapted to detect applied force, or torque from a user;
a plurality of motors mounted at each joint in the arm support to control position and orientation of the forearm cuff, and to create a passive-motorized hybrid arm support, the plurality of motors enabling motorized control of the arm support;
an antigravity force mechanism that applies a constant upward and vertical force equal and opposite to a force of gravity acting on a user's arm;
a controller coupled to the plurality of motors and the at least one sensor,
an admittance control loop to motorize the passive support, wherein the controller is programmed with the admittance control loop;
an admittance control and an impedance control to control the position and orientation of the passive arm support based on applied forces and torques from the user;
the admittance control is applied to a fully motorized three degree of freedom (3 DOF) system,
a motor position conversion unit coupled with the admittance control for receiving inverse kinematics and boundary conditions from the admittance control;
an exoskeleton for support and direction of the user's arm through movement based on a residual strength of the user, and processed through the admittance control loop, wherein the passive support uses the admittance control and the impedance control for user exoskeleton interaction;
wherein the antigravity force mechanism further includes a virtual mass, and a damping or a damping coefficient required to keep the exoskeleton stable;
wherein, the user is able to be controlling motion of the forearm cuff while only being opposed by inertia of the virtual mass and the damping;
a time delay for the admittance control loop that is 10 ms or less to ensure the user exoskeleton interaction, wherein the impedance control decreases the time delay between a user interface and actual motion of the exoskeleton;
a virtual point mass for mapping the user's applied force to motion of the exoskeleton wherein the virtual point mass, friction, and inertia of the exoskeleton are minimized as compared to not using the virtual point mass for users with Duchenne muscular dystrophy (DMD) to operate the exoskeleton despite user diminished muscle strength;
the virtual point mass is set at 0.5 kg and the damping coefficient is set at 25 N*sec/m.;
a wheelchair, a table, or a desk at which the user is seated for mounting the exoskeleton thereon;
wherein, a joint angle is converted to a motor position and used to control an angle of each motor to translate and orient the forearm cuff and the user's arm to a desired position and orientation for each iteration of the control loop based on an applied force and a torque; and
wherein, the user is intuitively controlling motion of the forearm cuff while only being opposed by the inertia of the 0.5 kg virtual mass and the damping coefficient required to keep the system stable.

18. The method of claim 17, wherein the exoskeleton is used for rehabilitative purposes.

* * * * *